(12) United States Patent
Joo et al.

(10) Patent No.: US 10,768,401 B1
(45) Date of Patent: Sep. 8, 2020

(54) MICROSCOPE APPARATUS AND METHOD FOR CALIBRATING POSITION OF LIGHT SOURCE

(71) Applicants: INDUSTRY-ACADEMIC COOPERATION FOUNDATION, YONSEI UNIVERSITY, Seoul (KR); SMALL MACHINES, Daejeon (KR)

(72) Inventors: Chul Min Joo, Gyeonggi-do (KR); Seung Ri Song, Seoul (KR); Sun Woong Hur, Gyeonggi-do (KR); Jun Kyu Choi, Seoul (KR)

(73) Assignees: INDUSTRY-ACADEMIC COOPERATION FOUNDATION, YONSEI UNIVERSITY, Seoul (KR); SMALL MACHINES, Daejeon (KR)

( * ) Notice: Subject to any disclaimer, the term of this patent is extended or adjusted under 35 U.S.C. 154(b) by 0 days.

(21) Appl. No.: 16/598,054

(22) Filed: Oct. 10, 2019

(30) Foreign Application Priority Data

Jun. 28, 2019 (KR) .................. 10-2019-0077732

(51) Int. Cl.
*G02B 21/06* (2006.01)
*H04N 5/225* (2006.01)
*G06T 7/00* (2017.01)
*G06T 5/20* (2006.01)
*G06T 3/40* (2006.01)
(Continued)

(52) U.S. Cl.
CPC ........... *G02B 21/06* (2013.01); *G02B 21/367* (2013.01); *G06T 3/40* (2013.01); *G06T 5/20* (2013.01); *G06T 5/50* (2013.01); *G06T 7/0002* (2013.01); *G06T 7/70* (2017.01); *G06T 7/80* (2017.01); *G06T 7/97* (2017.01); *H04N 5/2256* (2013.01); *G06T 2207/10056* (2013.01); *G06T 2207/20212* (2013.01); *G06T 2207/30168* (2013.01)

(58) Field of Classification Search
CPC .. G02B 21/06; G06T 7/80; G06T 7/97; G06T 5/50; G06T 7/70
See application file for complete search history.

(56) References Cited

U.S. PATENT DOCUMENTS 6,577,417 B1 * 6/2003 Khoury ................... G02F 2/002
398/82
9,116,120 B2 * 8/2015 Rodenburg ............ A61B 6/483
(Continued)

OTHER PUBLICATIONS

Peng Li, "Investigations and improvements in ptychographic imaging", U. of Sheffield (Aug. 2016) (Year: 2016).*

*Primary Examiner* — David N Werner

(57) ABSTRACT

There is provided a microscope apparatus and method for calibrating the position of a light source according to an embodiment of the present disclosure. A microscope apparatus according to an embodiment of the present disclosure includes: a light source unit configured to radiate light onto an subject and including a light emitting element array having a plurality of light emitting elements; an optical unit disposed in parallel with the subject and configured to form enlarged images of the subject receiving the radiated light; an image sensor configured to generate enlarged pictures of the subject based on the enlarged images formed through the optical unit; and a processor operably connected with the light source unit, the optical unit, and the image sensor, and calibrating a position of the light source unit based on a plurality of images generated by the image sensor.

14 Claims, 13 Drawing Sheets

(51) Int. Cl.
  *G06T 5/50* (2006.01)
  *G02B 21/36* (2006.01)
  *G06T 7/70* (2017.01)
  *G06T 7/80* (2017.01)

(56) References Cited

U.S. PATENT DOCUMENTS

| | | | |
|---|---|---|---|
| 2002/0090127 A1* | 7/2002 | Wetzel | G01B 7/003 382/133 |
| 2004/0095576 A1* | 5/2004 | Wolleschensky | G01N 21/6428 356/317 |
| 2005/0043643 A1* | 2/2005 | Priemer | A61B 7/023 600/528 |
| 2007/0135051 A1* | 6/2007 | Zheng | H04B 7/18513 455/63.1 |
| 2007/0274605 A1* | 11/2007 | Yahil | G06T 5/003 382/275 |
| 2008/0170293 A1* | 7/2008 | Lucente | G02B 27/2214 359/463 |
| 2009/0052019 A1* | 2/2009 | Brueck | G02B 21/18 359/370 |
| 2010/0088035 A1* | 4/2010 | Etgen | G01V 1/30 702/16 |
| 2010/0242365 A1* | 9/2010 | Langner | E05D 15/0686 49/130 |
| 2013/0094077 A1* | 4/2013 | Brueck | G02B 21/06 359/385 |
| 2015/0268628 A1* | 9/2015 | Sato | G02B 21/365 356/457 |
| 2016/0267658 A1* | 9/2016 | Kleppe | G02B 21/0072 |
| 2017/0024859 A1* | 1/2017 | Schnitzler | G06T 5/002 |
| 2017/0176734 A1* | 6/2017 | Milde | G02B 21/365 |
| 2017/0301079 A1* | 10/2017 | Cho | G06T 7/0004 |
| 2018/0149855 A1* | 5/2018 | Chou | G02B 21/241 |
| 2018/0174279 A1* | 6/2018 | Anhut | G06T 7/97 |
| 2018/0191948 A1* | 7/2018 | Zheng | G02B 21/06 |
| 2018/0284418 A1* | 10/2018 | Cohen | G02B 3/0006 |
| 2019/0324253 A1* | 10/2019 | Zapata | G02B 21/0012 |

* cited by examiner (a)

(b)

(c)

(d)

(a)

(b)

MICROSCOPE APPARATUS AND METHOD FOR CALIBRATING POSITION OF LIGHT SOURCE

CROSS-REFERENCE TO RELATED APPLICATIONS

This application claims the priority of Korean Patent Application No. 2019-0077732 filed on Jun. 28, 2019, in the Korean Intellectual Property Office, the disclosure of which is incorporated herein by reference.

STATEMENT REGARDING RESEARCH OR DEVELOPMENT

The research was supported by the Institute for Information & Communications Technology Promotion (IITP) (Grant Number: 2018-0-01046) for ICT promising technology development support (R&D) funded by the Ministry of Science and ICT(MSIT).

BACKGROUND

Field

The present disclosure relates to a microscope apparatus and method for calibrating the position of a light source.

Description of the Related Art

A microscope apparatus forms an enlarged image of an subject by radiating light to an subject such as a sample by means of a light source and by allowing light reflected from the subject to pass through a lens, and generates an enlarged picture of the subject by capturing the formed image by means of an image sensor.

The enlarged picture needs to have high-quality and/or high resolution so that the enlarged picture generated by the microscope apparatus is accurately analyzed.

However, a position of the light source included in the microscope apparatus may be shifted while a user manipulates the microscope apparatus or the user transports the microscope apparatus. If the light source of which the position is shifted is used, the microscope apparatus may acquire an enlarged picture having noise caused by a position error of the light source.

Further, in order to find out the actual position of the light source with a shifted position, various techniques using position estimation are used, but these techniques have a problem in that it takes long time to find out the position of the light source.

Accordingly, when the position of a light source is shifted in a microscope apparatus, there is a need for a method of minimizing time that is taken to find out image noise and the accurate positions of a light source by accurately calibrating the position of the light source.

SUMMARY

An subject of the present disclosure is to provide a microscope apparatus and method for calibrating the position of a light source.

In detail, an subject of the present disclosure is to provide microscope apparatus and method for calibrating the position of a light source in order to minimize image noise caused by a position error of a light source and minimize time that is taken to find out the accurate position of the light source.

The subjects of the present disclosure are not limited to the subjects described above and other subjects will be clearly understood by those skilled in the art from the following description.

In order to achieve the subjects, there is provided a microscope apparatus and method for calibrating the position of a light source according to an embodiment of the present disclosure. A microscope apparatus for calibrating the position of a light source according to an embodiment of the present disclosure includes: a light source unit configured to radiate light onto an subject and including a light emitting element array having a plurality of light emitting elements; an optical unit disposed in parallel with the subject and configured to form enlarged images of the subject receiving the radiated light; an image sensor configured to generate enlarged pictures of the subject based on the enlarged images formed through the optical unit; and a processor operably connected with the light source unit, the optical unit, and the image sensor, and calibrating a position of the light source unit based on a plurality of images generated by the image sensor, wherein the processor is configured to: radiate a plurality of beams of light simultaneously or sequentially onto the subject using the light source unit; acquire a plurality of subject images for the subject based on the enlarged pictures from the image sensor; set a plurality of position error candidate values for the light source unit; acquire a plurality of final subject images by combining the plurality of subject images using the plurality of position error candidate values; calculate a plurality of image errors between the plurality of final subject images and an original image, and calibrate a position of the light source unit based on the plurality of image errors.

A method of calibrating a position of a light source unit in a microscope apparatus according to an embodiment of the present disclosure includes: radiating a plurality of beams of light simultaneously or sequentially onto an subject using a light source unit including a light emitting element array having a plurality of light emitting elements; generating enlarged pictures of the subject based on the enlarged images formed through an optical unit disposed in parallel with the subject; acquiring a plurality of subject images for the subject based on the enlarged pictures from an image sensor; setting a plurality of position error candidate values for the light source unit; acquiring a plurality of final subject images by combining the plurality of subject images using the plurality of position error candidate values; calculating a plurality of image errors between the plurality of final subject images and an original image; and calibrating a position of the light source unit based on the plurality of image errors.

Other detailed matters of the exemplary embodiment are included in the detailed description and the drawings.

According to the present disclosure, it is possible to acquire a high-quality and/or high-resolution enlarged image for an subject by minimizing image noise by accurately calibrating a position error of a light source.

Further, It is possible to quickly find out the accurate position of a light source and minimize the resources and the time that are consumed to find out the accurate position of a light source.

The effects of the present disclosure are not limited to those described above and more various effects are included in the present disclosure.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
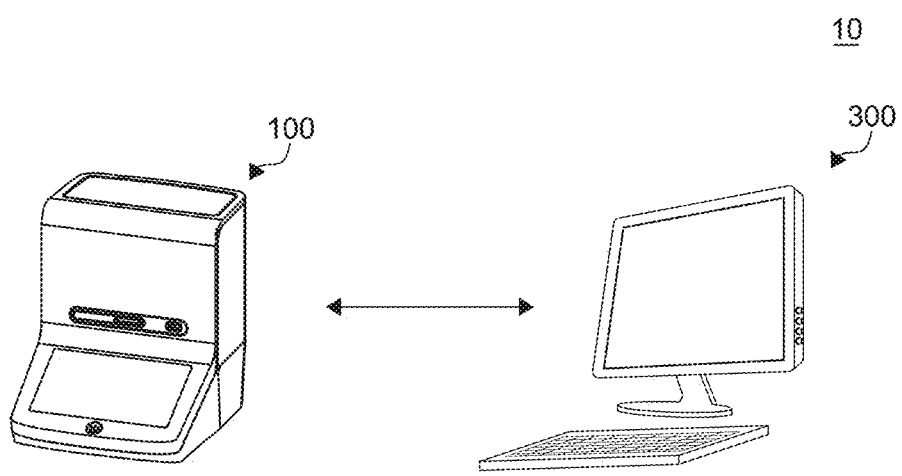
FIG. 1 is a configuration view of a microscope system according to an embodiment of the present disclosure.

The advantages and features of the present disclosure, and methods of achieving them will be clear by referring to the exemplary embodiments that will be describe hereafter in detail with reference to the accompanying drawings. However, the present disclosure is not limited to the exemplary embodiments described hereafter and may be implemented in various ways, and the exemplary embodiments are provided to complete the description of the present disclosure and let those skilled in the art completely know the scope of the present disclosure and the present disclosure is defined by claims.

Although terms 'first', 'second', etc. are used to describe various components, it should be noted that these components are not limited by the terms. These terms are used only for discriminating a component from another component. Accordingly, it should be noted that a first component that is stated below may be a second component within the spirit of the present disclosure.

Like reference numerals indicate like components throughout the specification.

The features of embodiments of the present disclosure may be partially or entirely combined or mixed, may be technically integrated and driven in various ways to enable those skilled in the art to sufficiently understand them, and may be implemented independently from each other or in association with each other.

Hereinafter, various embodiments of the present disclosure will be described in detail with reference to the accompanying drawings.

FIG. 1 is a configuration view of a microscope system according to an embodiment of the present disclosure.

Referring to FIG. 1, a microscope system 10 may include a microscope apparatus 100 which acquire an enlarged image of an subject, and a computing device 300 that is operably connected with the microscope apparatus 100, receives an image of an subject from the microscope apparatus 100, and provides the received image.

In various embodiments, the computing device 300 may be selectively included in the microscope system 10, and the computing device 300 may not be included in a case in the which the microscope apparatus 100 includes a display unit that may display an image of an subject.

The microscope apparatus 100 forms an enlarged picture of an subject such as an analytical sample by radiating or emitting light to a slide glass on which the subject is disposed, and the microscope apparatus 100 captures the formed image, thereby acquiring the enlarged picture of the subject. For example, the analysis sample may be a liquid sample such as whole blood, plasma, blood serum, saliva, ocular fluid, cerebrospinal fluid, sweat, urine, milk, ascites fluid, synovial fluid, peritoneal fluid, or cell lysate, or a solid sample of sub-organs in an integumentary system such as tissue, hairs, and nails.

An image acquired through the microscope apparatus 100, as described above, is used to perform research and/or diagnosis by analyzing the subject, so it needs to be a high-quality and/or high-resolution image.

Accordingly, the microscope apparatus 100 may use Fourier Ptychography for acquiring high-quality and/or high-resolution image by acquiring a plurality of subject images, arranging the acquired images in a Fourier Domain, and then combining the arranged images.

A light source that is used to acquire such a plurality of subject images may be a light emitted diode array (hereafter, referred to as 'light emitting element array') including a plurality of light emitting elements arranged in at least one row with regular intervals. In the light emitting element array, because the amount of light that is radiated to the subject may vary in accordance with positions of the respective light emitting elements, the images, which are acquired corresponding to the respective light emitting elements, may have different pieces of image information. For example, the light amounts of the light emitting elements positioned at an edge of the light emitting element array may be smaller than the light amounts of the light emitting elements positioned at a central portion of the light emitting element array. Therefore, an image acquired at the position of a particular light source may have high-resolution image information in respect to a particular part of an subject, and an image acquired at the position of another light source has low resolution image information in respect to the entire part of the subject.

To acquire a high-quality and/or high-resolution image by using the images having different pieces of image information as described above, the microscope apparatus 100 is configured such that the amounts of light emitted from the light emitting elements positioned at the edge of the light emitting element array are large, and as a result, the overall light amount of the light emitting element array may become constant. For example, in the microscope apparatus 100, an exposure time of a camera included in the microscope apparatus 100 may be adjusted so that the amount of light radiated from the light emitting elements positioned at the edge of the light emitting element array becomes large, or light intensities of the light emitting elements positioned at the edge of a light emitting element array may be adjusted to be higher than the light intensities of the light emitting elements positioned at the central portion of the light emitting element array.

However, even though the microscope apparatus 100 operates to make the whole light amount of a light emitting element array uniform, in order to acquire a high-quality and/or high resolution final image using corresponding subject images, the microscope apparatus 100 has to align low-resolution images acquired in accordance with the positions of the light emitting element to correspond to the positions of the light emitting elements in a Fourier Domain. If the position of a light emitting element array configured in the microscope apparatus 100 is not normal because of global shift (e.g., global shift on at least one of x-axis and y-axis), an image having noise caused by a position error of the light emitting element array may be acquired.

To prevent the occurrence of noise and acquire a high-quality and/or high resolution final image, the microscope apparatus 100 may set a plurality of certain position error candidate values for the light emitting element array, acquire a plurality of final subject images by combining subject images acquired by the light emitting elements constituting the light emitting element array, using the plurality of position error candidate values, calculate a plurality of image errors between the plurality of acquired final subject images and original images, and then calibrate the position of the light emitting element array based on the plurality of image errors. In this case, assuming that the center of the light emitting element array is globally shifted to a plurality of certain candidate positions, which are defined by at least one of a first axis (e.g., x-axis) defined in parallel with the arrangement direction of the plurality of light emitting elements and a second axis (e.g., y-axis) perpendicular to the first axis, with respect to an optical axis of a lens included in the microscope apparatus 100, the plurality of position error candidate values may mean error values between the position of the optical axis and the plurality of certain candidate positions. In the proposed embodiment, the plurality of position error candidate values may be 3 or more and 5 or less, but are not limited thereto. For example, when the light emitting element array is globally shifted along any one of the x-axis and the y-axis, three position error candidate values may be set, and when the light emitting element array is globally shifted along the x-axis and the y-axis, at least five position error candidate values may be set, but the position error candidate values are not limited thereto.

The microscope apparatus 100 can acquire a plurality of subject image based on a calibrated position of the light emitting element array, create a high-quality and/or high resolution final image by combining the plurality of subject images in a Fourier Domain, and then transmit the final image to the computing device 300.

In various embodiments, the microscope apparatus 100 may calibrate the position of a light emitting element array according to global shift of the light emitting element array after calibrating the position of the light emitting element array according to rotational shift of the light emitting element array, or may calibrate the position of a light emitting element array according to rotational shift after calibrating the position of the light emitting element array according to global shift. Here, the position calibration of a light emitting element array according to rotational transform may be performed in various ways. In the proposed embodiment, the position calibrations according to rotational shift and global shift are not limited to the order described above, and may be sequentially performed or simultaneously performed.

The computing device 300, which is operably connected to the microscope apparatus 100, may receive images of an subject from the microscope apparatus 100 and display an interface screen, which indicates the received images, through a display of the computing device 300. For example, the images of an subject may be low-quality and/or low-resolution images acquired in correspondence to light emitting elements or high-quality and/or high resolution images acquired by Fourier Ptychography.

In various embodiments, in the case in which the microscope apparatus 100 includes a display, the microscope apparatus 100 may display an interface screen, which indicates the image of an subject, through the display.

In various embodiments, in a case in which the display of the microscope apparatus 100 is a touch screen, the microscope apparatus 100 may provide the interface screen for controlling the function of the microscope apparatus 100 through the display. Therefore, a user can control various functions of the microscope apparatus 100 through the provided interface screen.

Hereafter, the microscope apparatus 100 is described in more detail with reference to FIGS. 2 and 3.

Figure 2:
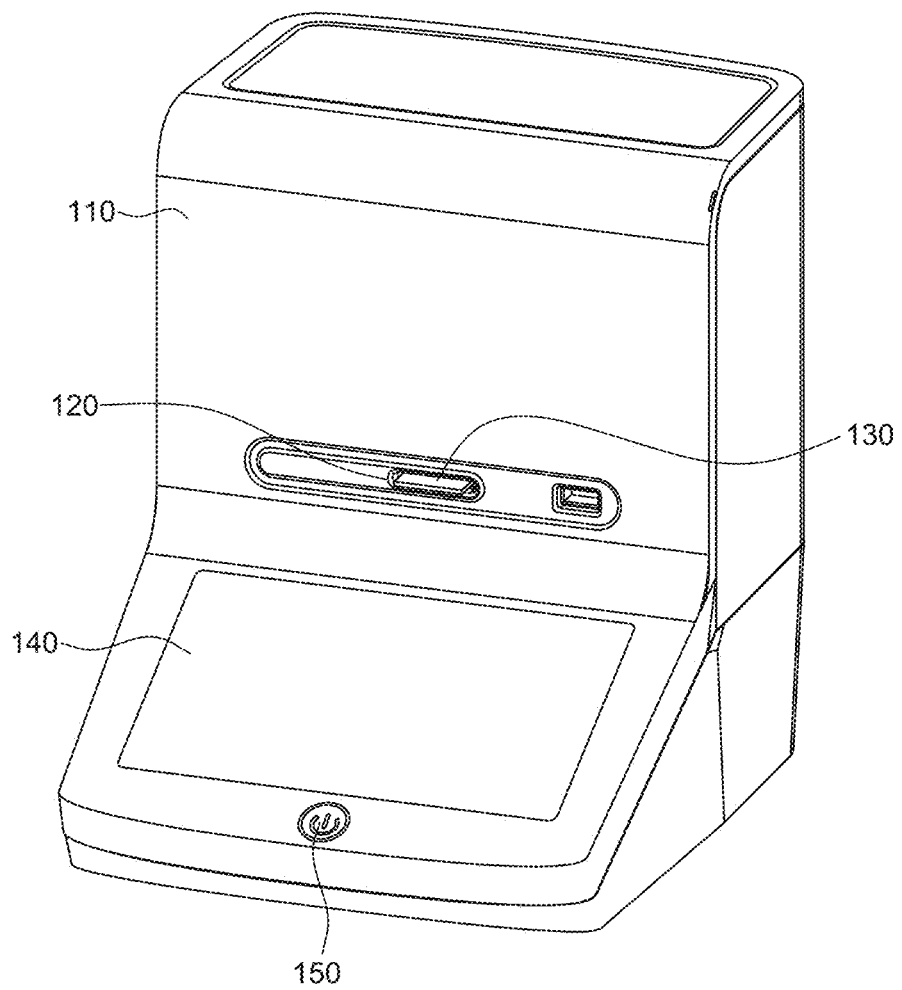
FIG. 2 is a perspective view of a microscope apparatus according to an embodiment of the present disclosure.
Figure 3:
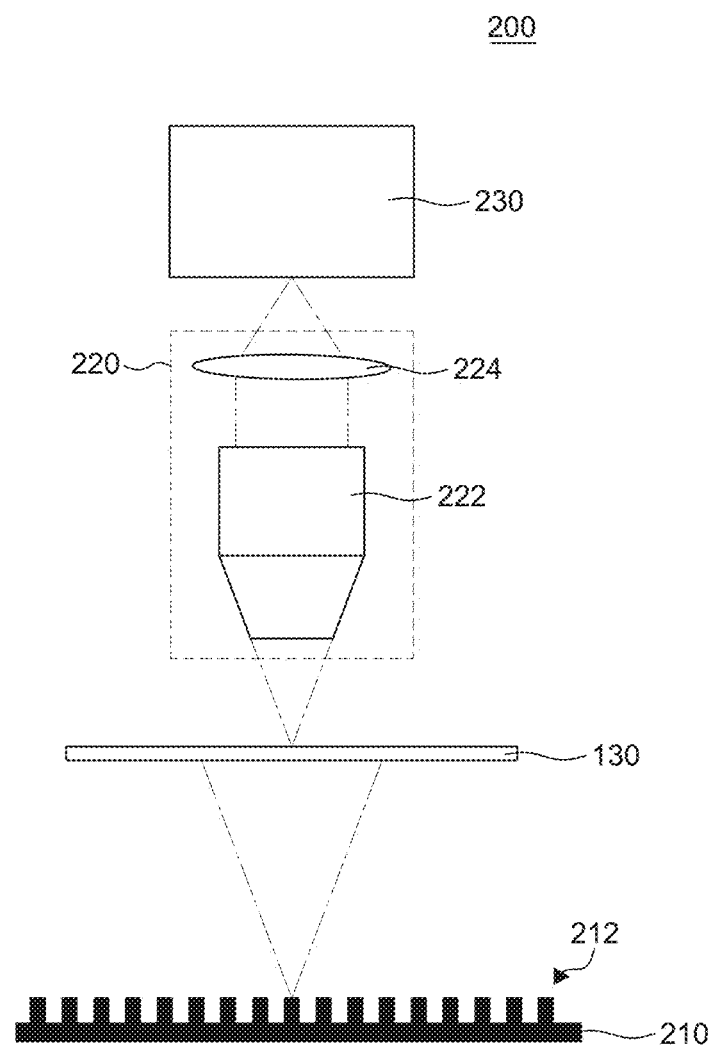
FIG. 3 is a configuration view of an image acquisition unit included in a microscope according to an embodiment of the present disclosure.

FIG. 2 is a perspective view of a microscope apparatus according to an embodiment of the present disclosure and FIG. 3 is a configuration view of an image acquisition unit included in a microscope according to an embodiment of the present disclosure.

Referring to FIGS. 2 and 3, the microscope apparatus 100 may include a housing 110 formed to surround an image acquisition unit 200 for acquiring enlarged pictures of an subject.

An insertion unit 120, through which a slide glass 130 having an subject disposed thereon may be inserted in the housing 110, a display unit 140 for displaying various contents related to the microscope apparatus 100, and a power source unit 150 for turning on or off the power of the microscope apparatus 100 may be formed at one side of the housing 110.

The insertion unit 120 may be formed at an appropriate position at one side of the housing 110 such that the slide glass 130 having an subject disposed thereon is placed at an appropriate position for acquiring enlarged pictures of the subject when the slide glass 130 is inserted into the housing 110. For example, the appropriate position may be positioned between a light source unit 210 and an optical unit 220 which is disposed in parallel with the light source unit 210 and an optical unit 220 which is disposed in parallel with the light source unit 210 based on an optical axis of the optical unit 220, as illustrated in FIG. 2. The display unit 140 may be selectively included and may provide a user interface related to various functions of the microscope apparatus 100.

In the proposed exemplary embodiment, the insertion unit 120, the display unit 140, and the power unit 150 are described as being formed at one side of the housing 110, the present disclosure is not limited thereto, and the insertion unit 120, the display unit 140, and the power unit 150 may be formed at various positions on the housing 110 to acquire enlarged pictures of an subject.

The image acquisition unit 200 formed in the housing 110 may include a light source unit 210, an optical unit 220, and an image sensor 230 for acquiring enlarged pictures of an subject which is inserted into the housing 110 through the insertion unit 120. The light source unit 210, the optical unit 220, and the image sensor 230 may be disposed in parallel with one another based on the optical axis of the optical unit 220, and an subject, which is inserted through the insertion unit 120, may be disposed in parallel with the light source unit 210, the optical unit 220, and the image sensor 230. When the slide glass 130 having an subject disposed thereon is inserted through the insertion unit 120, the inserted slide glass 130 may be disposed at an appropriate position between the light source unit 210 and the optical unit 220.

The light source unit 210 of the image acquisition unit 200 may be a light emitting element array in which a plurality of light emitting elements 212 is arranged. The plurality of light emitting elements 212 may emit light with the same color or different colors. The plurality of light emitting elements 212 of the light source unit 210 may radiate light to an subject by simultaneously or sequentially emitting light.

The optical unit 220 includes a first lens 222 and a second lens 224, and may form enlarged images of the subject by the light radiated to the subject from the light source unit 210 and can provide the formed pictures to the image sensor 230.

The first lens 222 may be an subjective lens as a lens that projects enlarged pictures of an subject formed by light radiated to the subject.

The second lens 224 may be a tube lens as a lens that provides to the image sensor 230 with the enlarged pictures projected by the first lens 222. The optical axes of the first lens 222 and the second lens 224 may coincide with each other.

The image sensor 230 may create at least one image by capturing the pictures of the subject that passes through the optical unit 220. For example, the image sensor 230 may include a CCD (Charge-Coupled Device) sensor and/or a CMOS (Complementary Metal Oxide Semiconductor) sensor, or the like.

A detailed operation for acquiring a high-quality and/or high-resolution image in the microscope apparatus 100 including a display unit is described with reference to FIG. 4.

Figure 4:
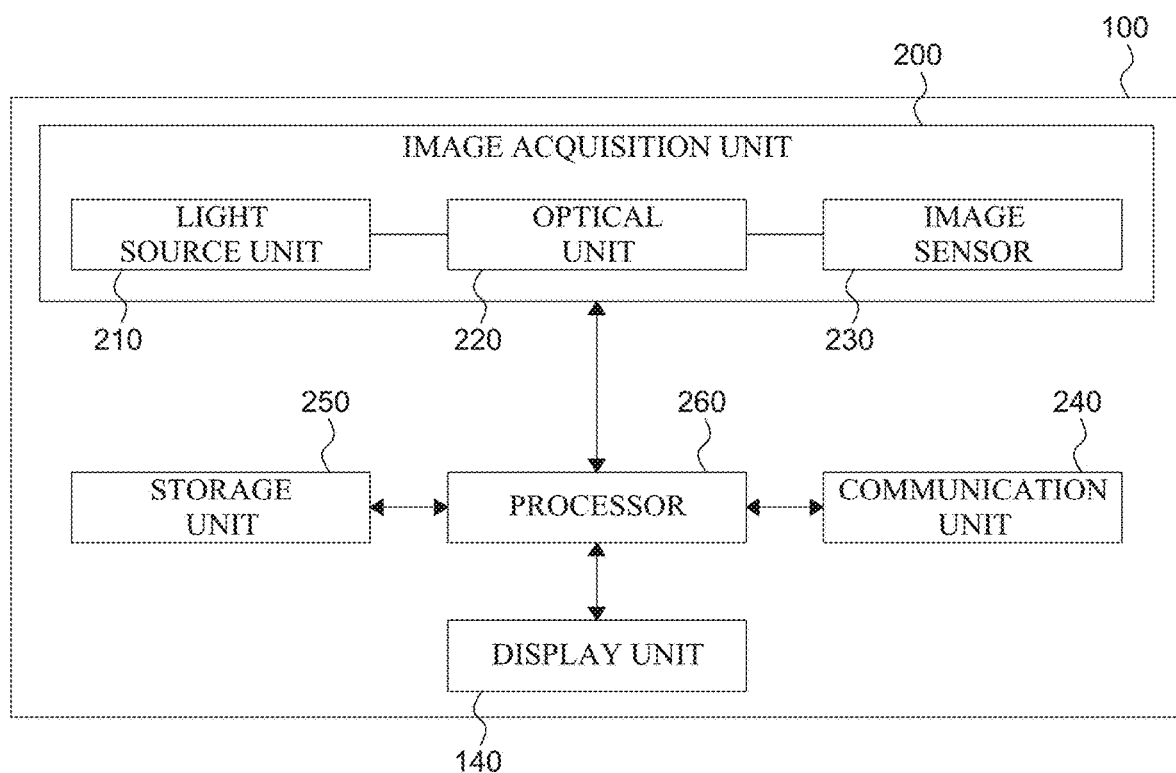
FIG. 4 is a block diagram of the microscope apparatus according to an embodiment of the present disclosure.

FIG. 4 is a block diagram of the microscope apparatus according to an embodiment of the present disclosure.

Referring to FIG. 4, the microscope apparatus 100 may include an image acquisition unit 200, a display unit 140, a communication unit 240, a storage unit 250, and a processor 260, in which the image acquisition unit 200 may include a light source unit 210, an optical unit 220, and an image sensor 230.

The light source unit 210 may be configured as a light emitting element array that is disposed to be movable in parallel and/or or rotatable and a plurality of light emitting elements 212 is arranged.

The optical unit 220 is composed of a plurality of lens arrays including a plurality of lenses, and the plurality of lens arrays may include a first lens 222 that may be an objective lens and a second lens 224 that may be a tube lens. The first lens 222 and the second lens 224 each may include one or more lenses. The optical axes of the first lens 222 and the second lens 224 may coincide with each other, and may be disposed in parallel with each other with respect to corresponding optical axes. The first lens 222 may be disposed to be closer to an subject than the second lens 224 with respect to the subject.

The lenses of the optical unit 220 may form an enlarged image of an subject based on light radiated to the subject by the light source unit 210 and may transmit the formed picture to the image sensor 230.

The image sensor 230 may capture the picture of the subject corresponding to the visual field range of the optical unit 220 based on the enlarged image formed through the optical unit 220.

The light source unit 210, the optical unit 220, and the image sensor 230 may be disposed in parallel with one another based on the optical axis of the optical unit 220. The subject, which is disposed at the appropriate position between the light source unit 210 and the optical unit 220, may also be disposed in parallel with the light source unit 210, the optical unit 220, and the image sensor 230 based on the optical axis.

The display unit 140 may display various contents (e.g., a text, an image, a video, an icon, a banner, and/or a symbol) to a user. In detail, the display unit 140 may display a user interface screen for controlling various functions of the microscope apparatus 100. For example, the various functions may include a function of calibrating of a light source position of the microscope apparatus 100, a function of acquiring a picture of an subject, a function of setting lens focusing of the microscope apparatus 100, a function of displaying a preview image, and/or a function of adjusting a lens magnification, etc. In various embodiments, the display unit 140 may display acquired picture. In this case, the various functions may further include a function of zooming in/zooming out operations in respect to acquired picture.

In various embodiments, the display unit 140 may include a touch screen, and for example, may receive touch, gesture, approach, drag, swipe, or hovering input using a portion of an electronic pen or a user's body.

The communication unit 240 is connected such that the microscope apparatus 100 may communicate with an external device. The communication unit 240 is connected with the computing device 300 using wire/wireless communication, and may transmit and receive various pieces of information. In detail, the communication unit 240 may transmit a picture of an subject to the computing device 300 so that the computing device 300 displays or stores the picture of the subject.

The storage unit 250 may store various data used when the microscope apparatus 100 check for an error in respect to a light source position and calibrate the error. Further, the storage unit 250 may store subject images and original images respectively corresponding to light emitting elements. In various embodiments, the storage unit 250 may also store graphic data used to configure a user interface related to various functions of the microscope apparatus 100.

In various embodiments, the storage unit 250 may include at least one type of storage medium of flash memory type, hard disk type, multimedia card micro type, and card type memories (e.g., an SD or XD memory), a RAM (Random Access Memory) an SRAM (Static Random Access Memory), a ROM (Read-Only Memory), an EEPROM (Electrically Erasable Programmable Read-Only Memory), a PROM (Programmable Read-Only Memory), a magnetic memory, a magnetic disc, and an optical disc. The microscope apparatus 100 can operate in association with a web storage that performs the storage function of the storage unit 250 on the internet.

The processor 260 is operably connected with the image acquisition unit 200, the display unit 140, the communication unit 240, and the storage unit 250, and may perform various instructions for calibrating of a light source position of the microscope apparatus 100 and acquiring a high-quality and/or high-resolution image of an subject based on the calibrated light source position.

To calibrate the position of the light source unit 210, the processor 260 may check a position error of the light source unit 210 and perform position calibration of the light source unit 210 based on the found position error. In detail, the processor 260 simultaneously or sequentially may radiate a plurality of beams of light to an subject using the plurality of light emitting element 212 constituting the light source unit 210 emit light, form enlarge images of the subject through the optical unit 220 based on the radiated light, and then generate the enlarged pictures of the subject based on the enlarged images through the image sensor 230, thereby acquire a plurality of subject images based on the enlarged pictures.

The processor 260 may set a plurality of position error candidate values for the light source unit 210. In detail, under the assumption that the center of the light emitting element array has been globally shifted to a plurality of certain candidate positions defined by at least one of a first axis and a second axis with respect to the optical axis of the optical unit 220, the processor 260 may set error values between the position of the optical axis and the plurality of certain candidate positions as a plurality of position error candidate values. For example, when a plurality of position error candidate values are set as five, the five position error candidate values may be expressed as $\Delta x_{1,2,3,4,5}$ and $\Delta y_{1,2,3,4,5}$.

The processor 260 may acquire a plurality of final subject images by combining a plurality of subject images using the plurality of set position error candidate values. To acquire a plurality of final subject images, the processor 260 may calculate a k-vector of each of the light emitting elements constituting the light emitting element array using each of a plurality of position error candidate values and combines a plurality of subject images using the calculated k-vectors and an Fourier Ptychography microscopy (FPM) algorithm, whereby the final subject images may be acquired.

The following Formula 1 may be used to calculate a k-vector ($k_x^{m,n}$, $k_y^{m,n}$) of each light emitting element using five position error candidate values.

$$k_x^{m,n} = -\frac{2\pi}{\lambda} \frac{x - x_{m,n} - \Delta x_{1,2,3,4,5}}{\sqrt{(x - x_{m,n} - \Delta x_{1,2,3,4,5})^2 + (y - y_{m,n} - \Delta y_{1,2,3,4,5})^2 + z^2}}$$

$$k_y^{m,n} = -\frac{2\pi}{\lambda} \frac{y - y_{m,n} - \Delta y_{1,2,3,4,5}}{\sqrt{(x - x_{m,n} - \Delta x_{1,2,3,4,5})^2 + (y - y_{m,n} - \Delta y_{1,2,3,4,5})^2 + z^2}}$$

[Formula 1]

where, x and y may be center coordinates of an subject, $x_{m,n}$ and $y_{m,n}$ may be position coordinates of (m, n)-th light emitting element, $\lambda$ may be the central wavelength value of a corresponding light emitting element, z may be the distance between an subject and a corresponding light emitting element, and $\Delta x_{1,2,3,4,5}$ and $\Delta y_{1,2,3,4,5}$ may be the plurality of position error candidate values. In this case, the central coordinates of an subject image may mean optical axis coordinates of the optical unit 220.

Assuming that position movement (e.g., global shift) of a light emitting element array has occurred, the distance from the center position of the light emitting element array that is used to calculate a k-vector to the center position of the (m, n)-th light emitting element may further include $\Delta x_{1,2,3,4,5}$ and $\Delta y_{1,2,3,4,5}$ that are position error candidate values. Therefore, the processor 260 may calculate the k-vector of the (m, n)-th light emitting element, using the distance from the center position of a light emitting element array including each of a plurality of position error candidate values to the center position of the (m, n)-th light emitting element, and the distance between the slide glass 130 having an subject disposed thereon and the light emitting element array. In this case, five k-vectors can be calculated for each light emitting element.

In various embodiments, to restore a high-resolution image by dividing an subject image into several segments, the processor 260 may divide each subject image into at least one image segment (e.g., low-resolution image) and calculate a k-vector of each light emitting element in association with each of the divided image segments. In this case, the processor 260 may calculate a k-vector by applying the center coordinates of each image segments to Formula 1 as an input parameter. In Formula 1 described above, x and y correspond to the center coordinates of an subject image, but when an subject image is divided, x and y in Formula 1 correspond to the center coordinates of the image segments. Therefore, the processor 260 may calculate k-vectors further using the distance between the center coordinates of the image segments and center coordinates of the subject image. Accordingly, the present disclosure may minimize the amount of calculation that is performed for image restoration.

The processor 260 may acquire a plurality of final subject images by combining a plurality of subject images in a Fourier Domain, using the calculated k-vectors and the FPM algorithm. Accordingly, a plurality of high-quality and/or high-resolution final subject images may be restored. In this case, the restored final subject images may be images in which noise has been caused by global shift.

The processor may generate a plurality of converted images by converting each of the plurality of acquired final subject image to correspond to at least one light emitting element and calculate image errors between the converted images correspond to at least one light emitting element and the original image corresponding to at least one light emitting element. Here, the converted image may be an image converted to match with an subject image acquired in correspondence to at least one light emitting element from each of a plurality of final subject image. Further, the original image to be compared with the converted image may be an subject image acquired in correspondence to the actual position of at least one light emitting element constituting a light emitting element array without rotational or global shift. The original image may be acquired in advance in correspondence to each light emitting element and stored in the storage unit 250 to check image errors. For example, when the number of articles of a plurality light emitting elements 212 included in a light emitting element array is 200, original images corresponding to 200 light emitting elements can be stored.

To calculate an image error $E_i$ between a converted image and an original image, when a position error of light emitting element array is $\Delta x_i$ and $\Delta y_i$ (i>0), the following Formula 2 based on an RMS (Root Mean Square) manner may be used.

$$E_i = \sum_{m,n} |I_{true}^{m,n} - I_{FPM}^{m,n,i}(\Delta x_i, \Delta y_i)|^2$$

[Formula 2]

where $I_{true}^{m,n}$ may indicate an original image corresponding to the (m, n)-th light emitting element and $I_{FPM}^{m,n,i}(\Delta x_i, \Delta y_i)$ may indicate a converted image corresponding to the (m, n)-th light emitting element. In particular, in m and n may indicate the (m, n)-th light emitting element of a light emitting element array, and l may indicate an image obtained by applying low pass filtering to a high-quality and/or high-resolution image restored through FPM algorithm corresponding to the position of the (m, n)-th light emitting element. The original image corresponding to the (m, n)-th light emitting element may be a low-quality and/or low-resolution image acquired at the position of the (m, n)-th light emitting element.

As described above, the image error between an image converted to correspond to at least one light emitting element and an original image corresponding to at least one light emitting element may be calculated to correspond to the number of articles of final subject images. For example, when final subject images are five, image errors to be calculated may be five.

In the proposed exemplary embodiment, an operation of calculating an image error using an RMS manner was described, the present disclosure is not limited thereto, and various manners such as using an entropy manner can be used.

The processor 260 may calibrate the position of a light emitting element array based on a plurality of calculated image errors. In detail, the processor 260 may define at least one polynomial function including a plurality of image errors using polynomial interpolation and calculate a minimum image error and a position error corresponding to the minimum image error based on the at least one polynomial function. For example, to determine a position error corresponding to a minimum image error, the following Formula 3 based on polynomial interpolation may be used.

$$\text{Optimal Position Shift} = \underset{\Delta x, \Delta y}{\arg\min} \sum_i \sum_{m,n} |I_{true}^{m,n} - I_{FPM}^{m,n}(\Delta x_i, \Delta y_i)|^2 \quad [\text{Formula 3}]$$

where $\Delta_x$ and $\Delta_y$ may indicate a position error corresponding to a minimum image error.

The processor 260 may calibrate the position of the light source unit 210 using the position error. For example, the processor 260 may calibrate the position of a light emitting element array by adding the position error to the center coordinates of the light emitting element array. The position of the light source unit 210 calibrated using the position error as described above may be an optimal position of the light source unit 210.

In various embodiments, the processor 260 may set at least new position error candidate value, acquire a new image error in correspondence to the at least one set new position error value, and then perform again the operation that acquires a minimum image error for calculating a position error of the light source unit 210 using some image errors of a plurality of image errors and the new image error. The processor 260 may calibrate the position of the light source unit 210 using the minimum position error calculated as the result of re-performing. Here, some image errors may include a minimum image error and the next small image error following the minimum image error of a plurality of image errors, but are not limited thereto.

For example, the processor 260 may set a new position error value in relation to the (m, n)-th light emitting element and acquire a final subject image by combining a plurality of subject image respectively corresponding to light emitting elements using the new position error value.

The processor 260 may generate converted images by converting the acquired final subject image to be matched with the subject image acquired by the (m, n)-th light emitting element and calculate new image errors between the converted images and the original image corresponding to the (m, n)-th light emitting element. The processor 260 may create a polynomial function including a first image error that is the minimum image error of a plurality of image errors acquired through the previous polynomial function, a second image error that is the next small image error following the minimum image error, and a third image error that is a newly calculated image error, acquire a position error corresponding to the minimum image error of the polynomial function, and then perform position calibration on a light emitting element array using the acquired position error.

It was described that the operation of acquiring a minimum image error for calculating a position error of a light emitting element array is performed again in the proposed embodiment, but the present disclosure is not limited thereto, and the re-performing operation may be performed several times. In this case, the calibrated position of the light source unit 210 may be more optimal position. Therefore, accurate position calibration can be performed on a light source.

When position calibration of the light source unit 210 is finished, the processor 260 may acquire a high-quality and/or high-resolution final image by combining subject images corresponding to the light emitting elements, and then display an interface screen which indicates the acquired final image through the display unit 140 or transmit the final image to the computing device 300 through the communication unit 240.

As described above, the present disclosure can acquire and provide a high-quality and/or high-resolution enlarged image with minimized noise by quickly find out the accurate position of a light source.

Figure 5:
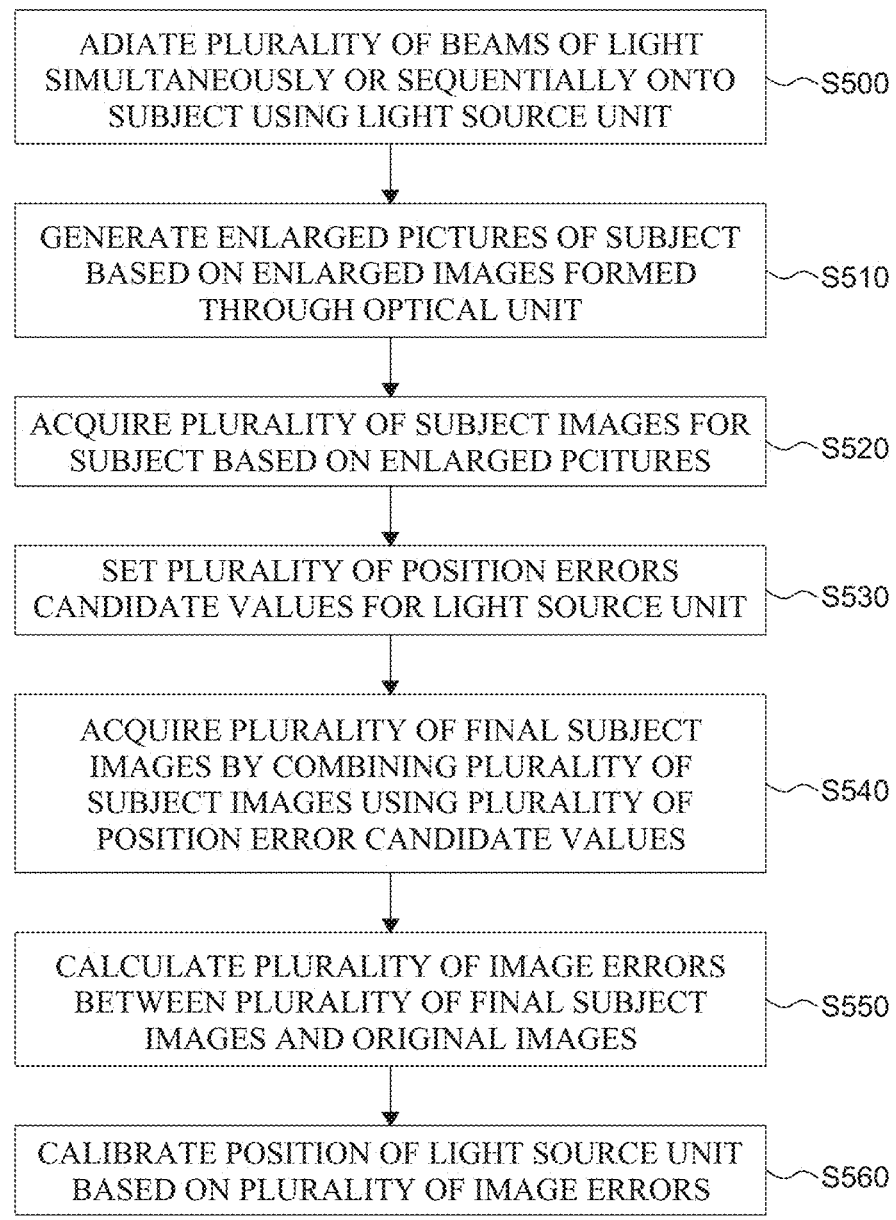
FIG. 5 is a flowchart showing a method for calibrating the position of a light source in the microscope apparatus according to an embodiment of the present disclosure.

FIG. 5 is a flowchart showing a method for calibrating the position of a light source in the microscope apparatus according to an embodiment of the present disclosure. Operations to be described hereafter can be performed by the processor 260 of the microscope apparatus 100.

Referring to FIG. 5, the microscope apparatus 100 simultaneously or sequentially radiates a plurality of beams of light onto an subject using the light source unit 210 (S500), generates enlarged pictures of the subject based on the enlarged images formed through the optical unit 220 (S510), and acquires a plurality of subject images for the subject based on the enlarged pictures (S520).

The microscope apparatus 100 sets a plurality of position error candidate values for the light source unit 210 (S530) and acquires a plurality of final subject images by combining the plurality of subject images using the plurality of position error candidate values (S540).

In detail, the microscope apparatus 100 may set a plurality of position error candidate values of a light emitting element array and calculate the k-vectors of the (m, n)-th light emitting element using the plurality of position error candidate values. The microscope apparatus 100 may generate a plurality of final subject images by combining the plurality of subject images using the plurality of k-vectors. For example, assuming that the center coordinates of a light emitting element array have been globally shifted to five certain position coordinates defined by an x-axis corresponding to a first axis of the light emitting element array and a y-axis corresponding to a second axis, a plurality of position error candidate values may mean the distance values from the center coordinates of the light emitting element array to the five certain position coordinates. In this case, the plurality of position error candidate values may be expressed as $(\Delta x_1, \Delta y_1)$, $(\Delta x_2, \Delta y_2)$, $(\Delta x_3, \Delta y_3)$, $(\Delta x_4, \Delta y_4)$, and $(\Delta x_5, \Delta y_5)$.

The microscope apparatus 100 may calculate a plurality of k-vectors for the (m, n)-th light emitting element and generate a plurality of final subject images by combining a plurality of subject images in a Fourier Domain using the plurality of k-vectors and the FPM algorithm. The microscope apparatus 100 may calculate the k-vector of the (m, n)-th light emitting element, using the distance between the center coordinates of the light emitting element array including each of a plurality of position error candidate values and the position coordinates of the (m, n)-th light emitting element, and the distance between the slide glass 130 and the light emitting element array. To calculate a plurality of k-vectors for the (m, n)-th light emitting element, the above Formula 1 can be used.

Accordingly, the microscope apparatus 100 may calculate the k-vectors for all of the light emitting elements constituting the light emitting element array. The microscope apparatus 100 may generate a plurality of final subject images by combining subject images corresponding to all the light emitting elements using the k-vectors for all the light emitting elements and the FPM algorithm. For example, five final subject image can be generated.

The microscope apparatus 100 calculates a plurality of image errors between the plurality of final subject images and original images (S550) and calibrates the position of the light source unit 210 based on the plurality of image errors (S560).

In detail, the microscope apparatus 100 may generate a plurality of converted images by converting the plurality of final subject images to be matched with the subject image acquired in correspondence to the (m, n)-th light emitting element and calculate image errors between the converted images and the original image corresponding to the (m, n)-th light emitting element. For example, the microscope apparatus 100 may generate a plurality of converted images by converting a plurality of final subject images to be matched with an subject image corresponding to the (m, n)-th light emitting element by moving the plurality of final subject images by the k-vectors of the (m, n)-th light emitting element and then performing low pass filtering.

The microscope apparatus 100 may calculate $E_1$, $E_2$, $E_3$, $E_4$, and $E_5$ that are image errors between the converted images and the original images (e.g., low-resolution image) corresponding to the (m, n)-th light emitting element. To calculate these image errors, the above Formula 2 can be used. For example, the microscope apparatus 100 may generate a converted image by converting a first final subject image of a plurality of final subject images to be matched with the subject image corresponding to the (m, n)-th light emitting element and calculate $E_1$ that is an image error value between the converted image and the original image corresponding to the (m, n)-th light emitting element. The microscope apparatus 100 may generate a converted image by converting a second final subject image of a plurality of final subject images to be matched with the subject image corresponding to the (m, n)-th light emitting element and calculate $E_2$ that is an image error value between the converted image and the original image corresponding to the (m, n)-th light emitting element. The microscope apparatus 100 may generate a converted image by converting a third final subject image of a plurality of final subject images to be matched with the subject image corresponding to the (m, n)-th light emitting element and calculate $E_3$ that is an image error value between the converted image and the original image corresponding to the (m, n)-th light emitting element. The microscope apparatus 100 may generate a converted image by converting a fourth final subject image of a plurality of final subject images to be matched with the subject image corresponding to the (m, n)-th light emitting element and calculate $E_4$ that is an image error value between the converted image and the original image corresponding to the (m, n)-th light emitting element. The microscope apparatus 100 may generate a converted image by converting a fifth final subject image of a plurality of final subject images to be matched with the subject image corresponding to the (m, n)-th light emitting element and calculate $E_5$ that is an image error value between the converted image and the original image corresponding to the (m, n)-th light emitting element.

In this case, the microscope apparatus 100 may determine $E_1$ as a first image error corresponding to the first position error value, $E_2$ as a second image error corresponding to the second position error value, $E_3$ as a third image error corresponding to the third position error value, $E_4$ as a fourth image error corresponding to the fourth position error value, and $E_5$ as a fifth image error corresponding to the fifth position error value.

In various embodiments, the microscope apparatus 100 may generate a plurality of converted images by converting the plurality of final subject images to be matched with the subject image acquired in correspondence to the (m+1, n+1)-th light emitting element and calculate $E_6$, $E_7$, $E_8$, $E_9$, and $E_{10}$ that are image error values between the converted images and the original image corresponding to the (m+1, n+1)-th light emitting element. For example, the microscope apparatus 100 may generate a converted image by converting a first final subject image of a plurality of final subject images to be matched with the subject image corresponding to the (m+1, n+1)-th light emitting element and calculate $E_6$ that is an image error value between the converted image and the original image corresponding to the (m+1, n+1)-th light emitting element. The microscope apparatus 100 may generate a plurality of converted images by converting a second final subject image of a plurality of final subject images to be matched with the subject image corresponding to the (m+1, n+1)-th light emitting element and calculate $E_7$ that is an image error value between the converted image and the original image corresponding to the (m+1, n+1)-th light emitting element. The microscope apparatus 100 may generate a plurality of converted images by converting a third final subject image of a plurality of final subject images to be matched with the subject image corresponding to the (m+1, n+1)-th light emitting element and calculate $E_8$ that is an image error value between the converted image and the original image corresponding to the (m+1, n+1)-th light emitting element. The microscope apparatus 100 may generate a plurality of converted images by converting a fourth final subject image of a plurality of final subject images to be matched with the subject image corresponding to the (m+1, n+1)-th light emitting element and calculate $E_9$ that is an image error value between the converted image and the original image corresponding to the (m+1, n+1)-th light emitting element. The microscope apparatus 100 may generate a plurality of converted images by converting a fifth final subject image of a plurality of final subject images to be matched with the subject image corresponding to the (m+1, n+1)-th light emitting element and calculate $E_{10}$ that is an image error value between the converted image and the original image corresponding to the (m+1, n+1)-th light emitting element.

In this case, the microscope apparatus 100 may combine $E_1$, $E_2$, $E_3$, $E_4$, and $E_5$ calculated in relation to the (m, n)-th light emitting element respectively with $E_6$, $E_7$, $E_8$, $E_9$, $E_{10}$ that are image errors calculated in relation to the (m+1, n+1)-th light emitting element, and determine the combined ($E_1+E_6$) as a first image error corresponding to the first position error value, the combined ($E_2+E_7$) as a second image error corresponding to the second position error value, the combined ($E_3+E_8$) as a third image error corresponding to the third position error value, the combined ($E_4+E_9$) as a fourth image error corresponding to the fourth position error value, and the combined ($E_5+E_{10}$) as a fifth image error corresponding to the fifth position error value.

Although it was described in the proposed embodiment that a plurality of image error values calculated in correspondence to different light emitting elements is respectively combined, the present disclosure is not limited thereto and various methods for calculating error values may be used.

Although it was described in the proposed embodiment to combine image errors calculated in relation to one or two light emitting elements and determine the combination as a final image error between a final subject image and an original image, the present disclosure is not limited thereto, and it may be possible to calculate image errors in relation to three or more light emitting elements in the same method described above, combine the calculated image errors, and then determine the combination as a final image error.

Next, the microscope apparatus 100 may define a polynomial function including a plurality of calculated image errors, using polynomial interpolation, and perform position calibration of a light emitting element array using a minimum value of the polynomial function. For example, the polynomial function may be a quadric or cubic function showing a position error value according to an image error value. When a light emitting element array has been globally shifted to any one of an x-axis and a y-axis, the microscope apparatus 100 may define acquire a quadric polynomial function including at least three of image errors $E_1$, $E_2$, $E_3$, $E_4$, and $E_5$, and acquire a position error value according to a minimum image error value from the quadric polynomial function. When a light emitting element array has been globally shifted to an x-axis and a y-axis, the microscope apparatus 100 may define a cubic polynomial function including image errors $E_1$, $E_2$, $E_3$, $E_4$, and $E_5$, and acquire a position error value according to a minimum image error value from the cubic polynomial function.

In various embodiments, the operation described above can be applied in the same to image errors $E_6$, $E_7$, $E_8$, $E_9$, and $E_{10}$ and ($E_1+E_6$), ($E_2+E_7$), ($E_3+E_8$), ($E_4+E_9$), and ($E_5+E_{10}$). The microscope apparatus 100 may calibrate the position of a light emitting element array by adding a position error value acquired at the center coordinates of the light emitting element array.

Accordingly, the present disclosure may minimize image noise caused by a position error of a light source and minimize time that is taken to find out the accurate position of the light source, thereby being able to acquire a high-quality and/or high-resolution of an subject.

Figure 6:
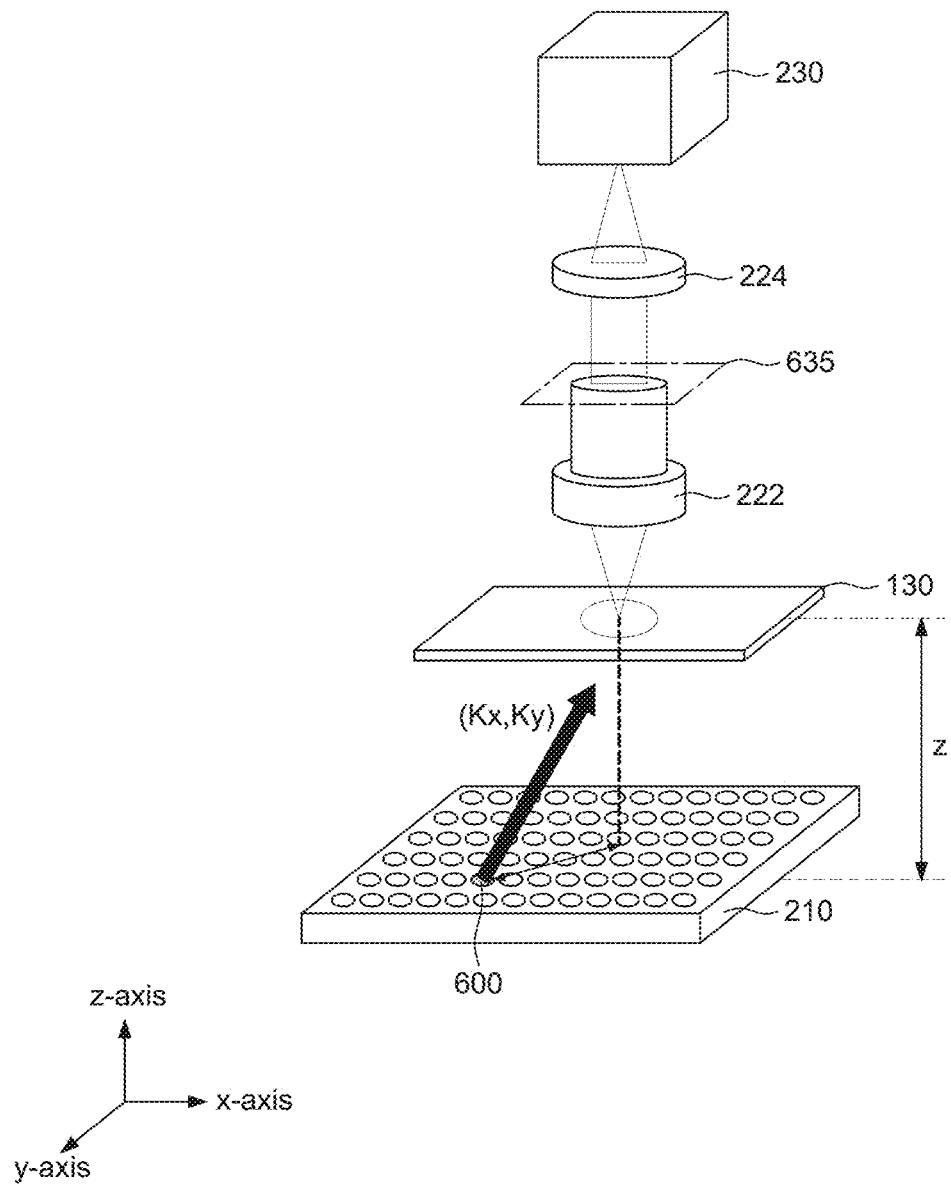
FIGS. 6 to 8 are exemplary views illustrating the method for calibrating the position of a light source in the microscope apparatus according to an embodiment of the present disclosure.
Figure 7:
Figure 7:
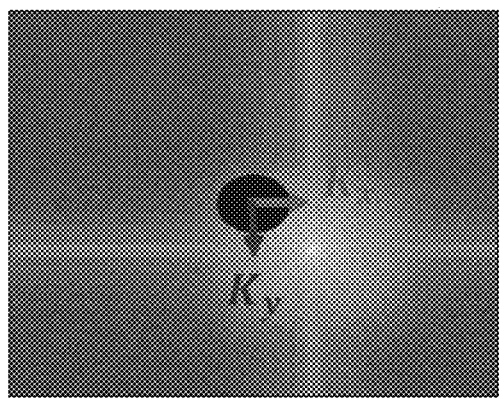
Figure 7:
Figure 7:
Figure 8:
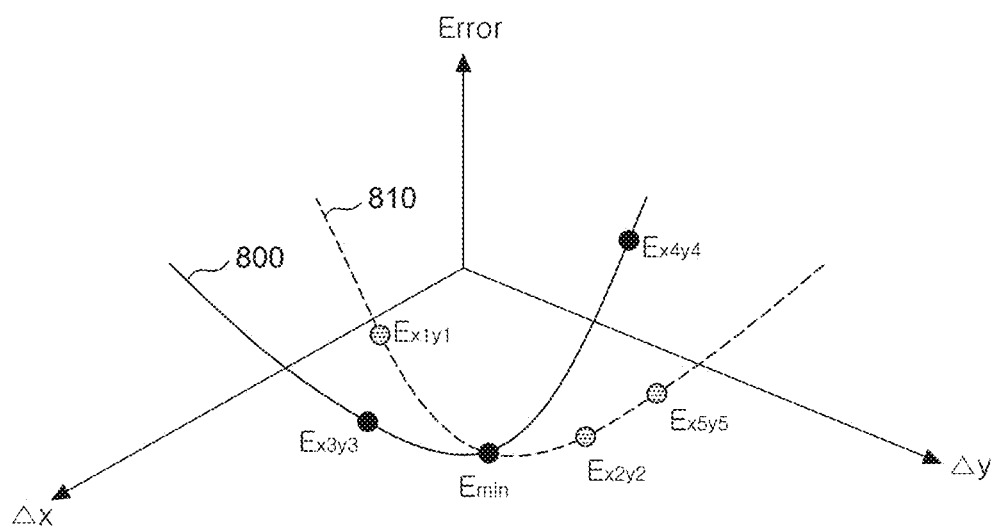

FIGS. 6 to 8 are exemplary views illustrating the method for calibrating the position of a light source in the microscope apparatus according to an embodiment of the present disclosure. In the proposed embodiment, the case of setting five position error candidate values is described.

Referring to FIG. 6, the microscope apparatus 100 may calculate five k-vectors related to an (m, n)-th light emitting element 600 from the above Formula 2, using the distance from the center coordinates of a light emitting element array (e.g., the light source unit 210) including five position error candidate values to the (m, n)-th light emitting element 600, and the distance z between the slide glass 130 and the light emitting element array.

For example, when a light emitting element array is composed of 200 light emitting elements, five k-vectors may be calculated in correspondence to each of the 200 light emitting elements. The microscope apparatus 100 may generate a plurality of final subject images by combining subject images respectively acquired in correspondence to the light emitting elements in a Fourier Domain 610 using the 5 k-vectors and the FPM algorithm. The microscope apparatus 100 may generate five final subject images by combining a plurality of subject images in a Fourier Domain using five k-vectors and the FPM algorithm. The microscope apparatus 100 may acquire converted images by moving the five final subject images by the k-vector of the (m, n)-th light emitting element to be matched with an subject image acquired in correspondence to the (m, n)-th light emitting element, and performing low pass filtering. The microscope apparatus 100 may calculate a plurality of image errors between the converted images and an original image corresponding to the (m, n)-th light emitting element. This is described in detail hereafter with reference to FIG. 7.

Referring to FIG. 7, the microscope apparatus 100 may generate a converted image by moving a final subject image acquired as shown in FIG. 7A by the k-vector of the (m, n)-th light emitting element, and performing low pass filtering. To this end, the microscope apparatus 100 may convert the final subject image into a Fourier Domain image corresponding to the position of the (m, n)-th light emitting element through Fourier transform. The Fourier Domain image can be shown as in FIG. 7B. The microscope apparatus 100 may acquire an image converted to correspond to the (m, n)-th light emitting element by performing low pass filtering and inverse Fourier transform on the Fourier Domain image. The image acquired in this way can be shown as in FIG. 7C. The microscope apparatus 100 may calculate a plurality of image errors between the acquired image and the original image shown in FIG. 7D. The microscope apparatus 100 may define at least one polynomial function including the plurality of image errors calculated in this way and the at least one polynomial function can be shown as in FIG. 8.

Referring to FIG. 8, when the plurality of calculated image errors is $E_{x1y1}$, $E_{x2y2}$, $E_{x3y3}$, $E_{x4y4}$, and $E_{x5y5}$, the microscope apparatus 100 may define polynomial functions 800 and 810 including $E_{x1y1}$, $E_{x2y2}$, $E_{x3y3}$, $E_{x4y4}$, and $E_{x5y5}$, using polynomial interpolation. The microscope apparatus 100 may acquire a minimum image error $E_{min}$ having a minimum value of the image errors constituting the polynomial functions 800 and 810. The microscope apparatus 100 may acquire a position error according to the acquired minimum image error $E_{min}$, using the above Formula 3, and calibrate the position of the light emitting element array using the acquired position error.

When position calibration of the light emitting element array is finished, the microscope apparatus 100 may calculate a k-vector of each of the light emitting elements constituting the calibrated light emitting element array, and acquire a high-quality and/or high-resolution final image by combining a plurality of subject images using the calculated k-vectors and the FPM algorithm. The high-quality and/or high-resolution final image acquired in this way may be an image with noise caused by a position error of the light source minimized.

Figure 9:
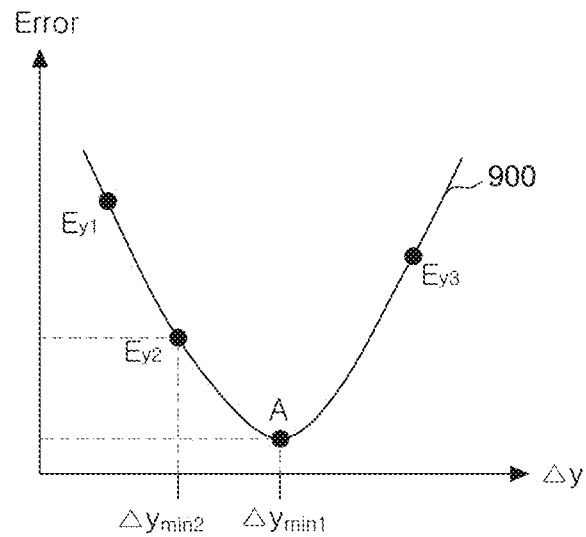
FIG. 9 is an exemplary view illustrating a method of re-performing an operation of acquiring a minimum image error that is used to calibrate the position of a light source in the microscope apparatus according to an embodiment of the present disclosure.
Figure 9:
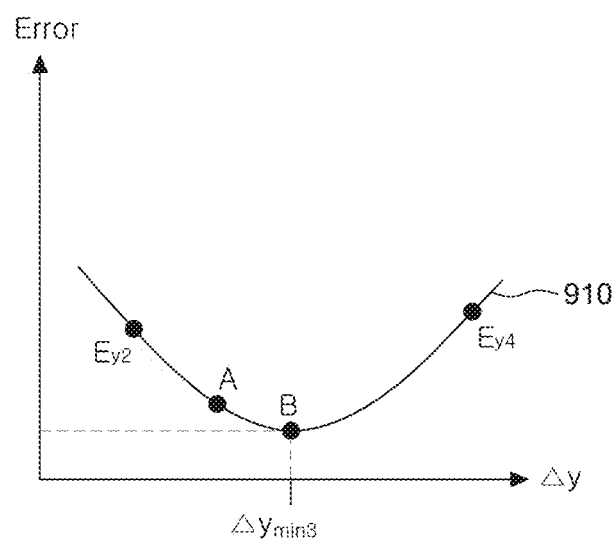

FIG. 9 is an exemplary view illustrating a method of re-performing an operation of acquiring a minimum image error that is used to calibrate a position in the microscope apparatus according to an embodiment of the present disclosure. In the proposed embodiment, a case in which three image errors have been acquired by the above-described method due to y-axial global shift of a light emitting element array without x-axial global shift is described. In this case, it is assumed that the acquired three image errors have been acquired based on three position error candidate values.

Referring to FIG. 9, the microscope apparatus 100 may define a first polynomial function 900 including three image errors $E_{y1}$, $E_{y2}$, and $E_{y3}$, as shown in FIG. 9A, using polynomial interpolation. The microscope apparatus 100 may perform an operation for setting a new position error candidate value of the global-shifted light emitting element array, and calculating a position error of the light emitting element array, using the newly set position error candidate value.

In this case, the microscope apparatus 100 may acquire a new image error $E_{y4}$ corresponding to the new position error candidate value through the operation of calculating an image error described above.

The microscope apparatus 100, as shown in FIG. 9B, may define a second polynomial function 910 including a first image error that is a minimum image error A of the first polynomial function 900, a second image error that is a next small image error $E_{y2}$ following the minimum image error A of the plurality of image errors $E_{y1}$, $E_{y2}$, and $E_{y3}$, and a third image error that is a new image error $E_{y4}$.

The microscope apparatus 100 may acquire a minimum image error B having a minimum value in the second polynomial function 910 acquired in this way. The microscope apparatus 100 may calculate an error value $\Delta y_{min3}$ according to the minimum image error B using the above Formula 3. The calculated position error value $\Delta y_{min3}$ may correspond to an optimal position error.

Although it was described that the operation of acquiring a minimum image error is re-performed one time in the proposed embodiment, the present disclosure is not limited thereto, and as the operation is re-performed several time, a more optimal position error can be calculated.

As described above, since the present disclosure calculates an optimal position error of a light emitting element array using at least three or five position error candidate values, it is possible to quickly find out the accurate position of the light emitting element array, and it is possible to minimize the resources and the time that are consumed to calculate an optimal position error of the light emitting element array.

FIGS. 10A, 10B, 10C, and 10D are exemplary views of interface screens that are displayed through a display unit of the microscope apparatus according to an embodiment of the present disclosure.

Figure 10A:
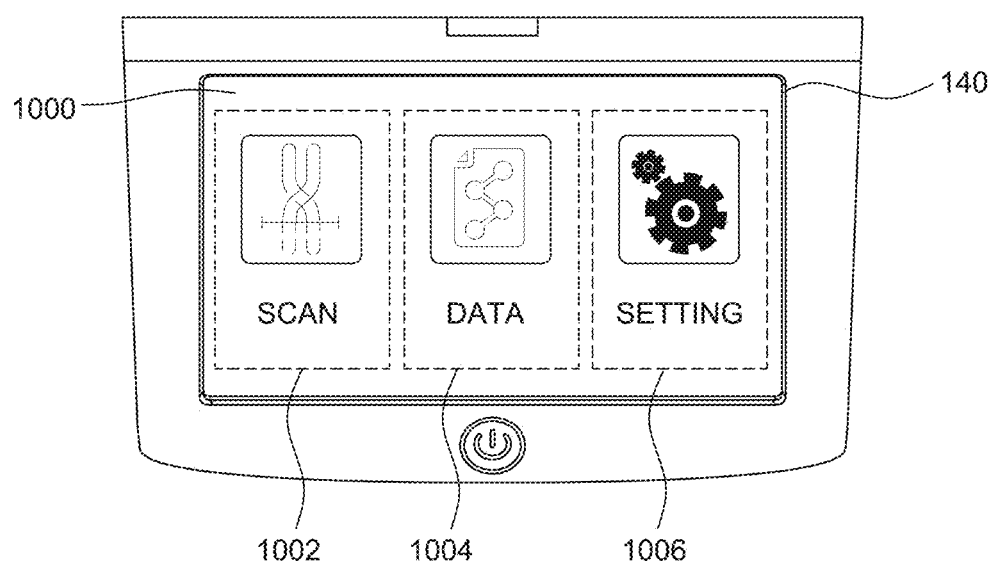
FIGS. 10A, 10B, 10C, and 10D are exemplary views of interface images that are displayed through a display unit of the microscope apparatus according to an embodiment of the present disclosure.

Referring to FIG. 10A, the display unit 140 of the microscope apparatus 100 may display an interface screen 1000 related to various functions of the microscope apparatus 100. For example, when an subject is inserted through the insertion unit 120 and the microscope apparatus 100 is turned on by the power unit 150, the display unit 140 may display the interface screen 1000.

The interface screen 1000 may include a first icon 1002 for creating an enlarged image of an subject, a second icon 1004 for ascertaining a stored enlarged image, and a third icon 1006 related to setting of the microscope apparatus 100. When the first icon 1002 is selected by a user, the display unit 140, as shown in FIG. 10B, may display an interface screen 1010 for creating an enlarged image.

Figure 10B:
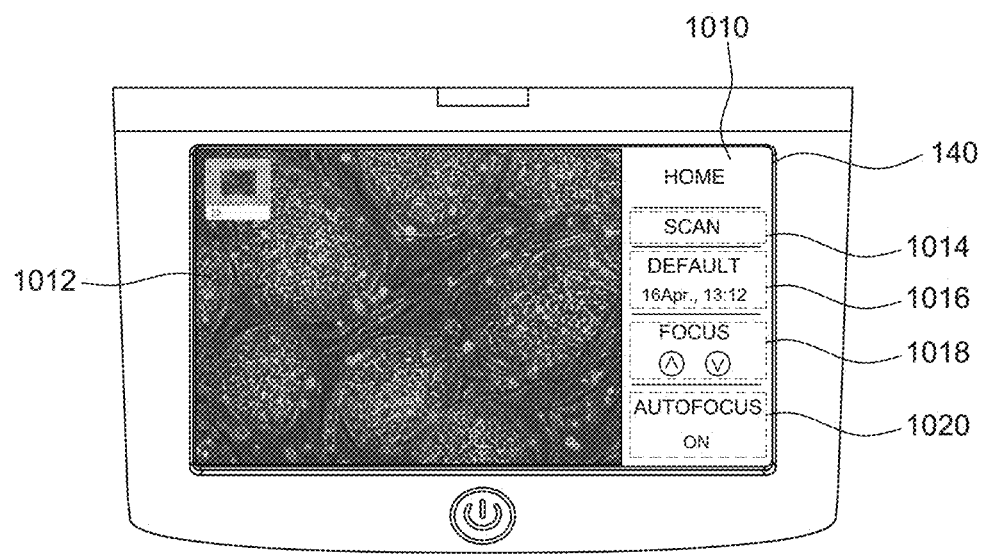

Referring to FIG. 10B, the interface screen 1010 may include a first icon 1014 for capturing (or scanning) an enlarged picture of an subject together with a preview region 1012 for previewing the enlarged image of the subject, a first text 1016 indicating a name, a size, and a ratio basically set to the image, a second icon 1018 for adjusting a focus of the light source unit, and a second text 1020 indicating a use or non-use of auto-focusing function.

Figure 10C:
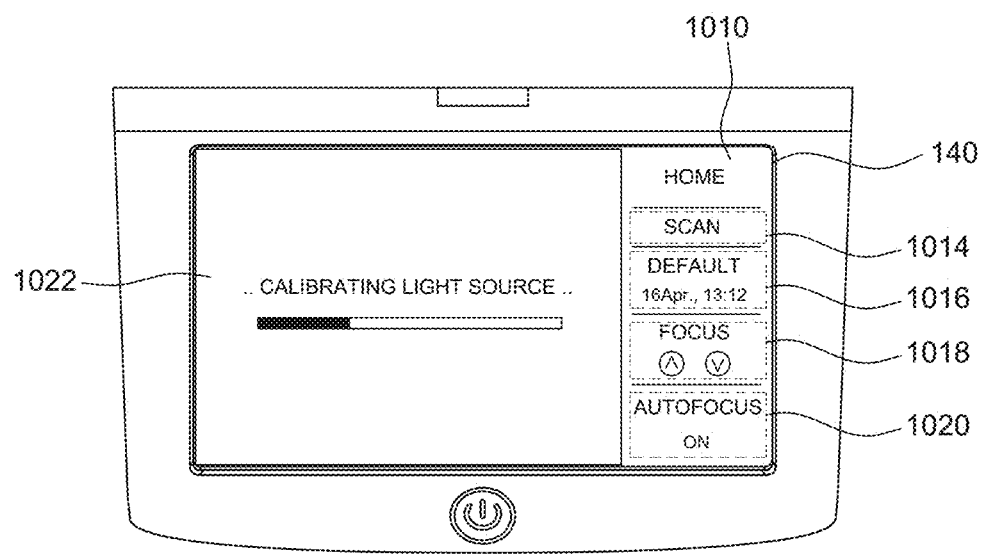
Figure 10D:
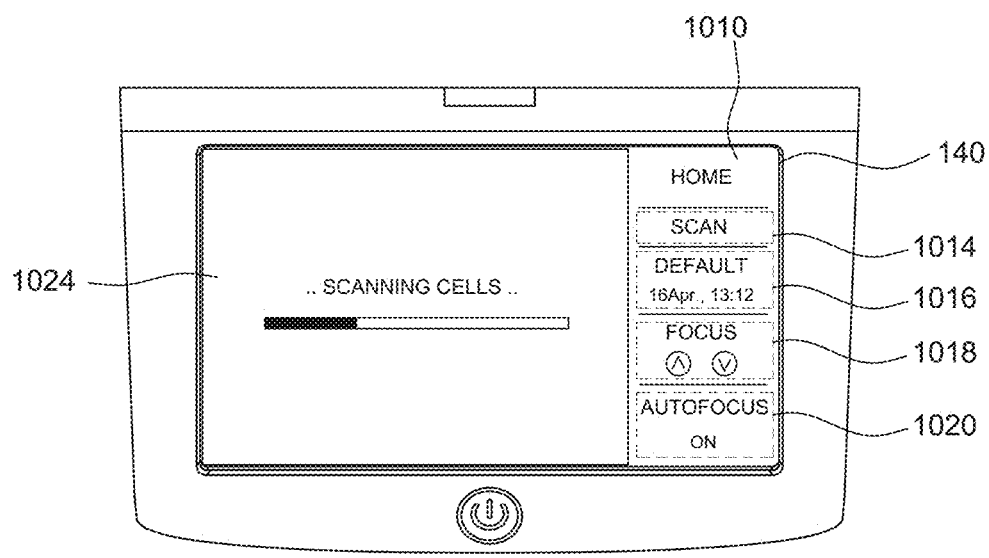

When the first icon 1014 is selected by a user, the microscope apparatus 100 may calibrate a light source position and display a graphic screen 1022 that indicates light source calibration, as shown in FIG. 10C, by means of the display unit 140 during a position calibration. When the position calibration is completed, the microscope apparatus 100 may acquire an enlarged image and display a graphic screen 1024 that indicates an acquired image, as shown in FIG. 10D, by means of the display unit 140 during an image acquisition. When the image acquisition is completed, the microscope apparatus 100 may display the enlarged image by means of the display unit 140 or may transmit the enlarged image to the computing device 300.

The interface screens shown in FIGS. 10A, 10B, 10C, and 10D are not limited to the above description in the proposed embodiment, and various interface images may be configured.

As described above, the present disclosure may minimize image noise according to a position error of a light source and minimize time that is taken to find out the accurate position of the light source, thereby being able to provide a high-quality and/or high resolution subject image.

The apparatus and method according to embodiments of the present disclosure may be implemented in a program commands that may be executed by various computers and may be recorded on computer-readable media. The computer-readable media may include program commands, data files, and data structures individually or in combinations thereof.

The program commands that are recorded on a computer-readable recording media may be those specifically designed and configured for the present disclosure or may be those available and known to those engaged in computer software in the art. The computer-readable recording media include magnetic media such as hard disks, floppy disks, and magnetic media such as a magnetic tape, optical media such as CD-ROMs and DVDs, magneto-optical media such as floptical disks, and hardware devices specifically configured to store and execute program commands, such as ROM, RAM, and flash memory. The program commands include not only machine language codes compiled by a compiler, but also high-level language code that may be executed by a computer using an interpreter etc.

The above hardware device may be configured to operate as one or more software modules to perform the operation of the present disclosure, and vice versa.

Although embodiments of the present disclosure were described in more detail with reference to the accompanying drawings, the present disclosure is not limited to the embodiments and may be modified in various ways without departing from the scope of the present disclosure. Accordingly, the embodiments described herein are provided merely not to limit, but to explain the spirit of the present disclosure, and the spirit of the present disclosure is not limited by the embodiments. Therefore, the embodiments described above are only examples and should not be construed as being limitative in all respects. The protective range of the present disclosure should be construed by the following claims and the scope and spirit of the disclosure should be construed as being included in the patent right of the present disclosure.

What is claimed is:

1. A microscope apparatus comprising:
a light source unit configured to radiate light onto a[ [n]] subject and including a light emitting element array having a plurality of light emitting elements;
an optical unit disposed in parallel with the subject and configured to form enlarged images of the subject receiving the radiated light;
an image sensor configured to generate enlarged pictures of the subject based on the enlarged images formed through the optical unit; and
a processor operably connected with the light source unit, the optical unit, and the image sensor, and calibrating a position of the light source unit based on a plurality of image generated by the image sensor, wherein the processor is configured to:
radiate a plurality of beams of light simultaneously or sequentially onto the subject using the light source unit;
acquire a plurality of subject images for the subject based on the enlarged pictures from the image sensor;
set a plurality of position error candidate values for the light source unit;
acquire a plurality of final subject images by combining the plurality of subject images using the plurality of position error candidate values;
calculate a plurality of image errors between the plurality of final subject images and original images; and
calibrate a position of the light source unit based on the plurality of image errors,
wherein the processor is further configured to:
calculate k-vectors of the light-emitting elements; and
acquire the plurality of final subject images using the k-vectors and a Fourier Ptychography microscopy (FPM) algorithm,
wherein the processor is further configured to convert the plurality of final subject images into a low-resolution image by:
moving the plurality of final subject images by the k-vectors of the light emitting elements; and
performing low pass filtering.

2. The microscope apparatus of claim 1, wherein the plurality of position error candidate values corresponds to a plurality of position error values by global shift.

3. The microscope apparatus of claim 1, wherein the processor is further configured to:
generate a plurality of converted images by converting each of the plurality of final subject images to be matched to a subject image acquired by a predetermined light emitting element; and
calculate a plurality of image errors based on the plurality of converted images and an original image corresponding to the predetermined light emitting element.

4. The microscope apparatus of claim 1, wherein the processor is further configured to:
define a first polynomial function including the plurality of image errors; and
determine a position error value of the light source unit using the first polynomial function.

5. The microscope apparatus of claim 4, wherein the processor is further configured to determine a position error value corresponding to a minimum image error of the first polynomial function as the position error value of the light source unit.

6. The microscope apparatus of claim 1, wherein the processor is further configured to:
select a new position error value after calculating the plurality of image errors;
determine a new image error corresponding to the new position error value;
define a second polynomial function including a minimum image error of the plurality of image errors, a next small image error following the minimum image error, and the new image error; and
determine a position error value of the light source unit based on the second polynomial function.

7. The microscope apparatus of claim 6, wherein the processor is further configured to determine a position error value corresponding to a minimum image error of the second polynomial function as the position error value of the light source unit.

8. A method of calibrating a position of a light source unit in a microscope apparatus, the method comprising:
radiating a plurality of beams of light simultaneously or sequentially onto a subject using a light source unit including a light emitting element array having a plurality of light emitting elements;
generating enlarged pictures of the subject based on enlarged images formed through an optical unit disposed in parallel with the subject;
acquiring a plurality of subject images for the subject based on the enlarged pictures from an image sensor;
setting a plurality of position error candidate values for the light source unit;
acquiring a plurality of final subject images by combining the plurality of subject images using the plurality of position error candidate values;
calculating a plurality of image errors between the plurality of final subject images and original images; and
calibrating a position of the light source unit based on the plurality of image errors,
wherein the acquiring of the plurality of final subject images includes:
calculating k-vectors of the light emitting elements; and
generating the plurality of final subject images based on the k-vectors and a Fourier Ptychography microscopy (FPM) algorithm; and
wherein the method further includes converting each of the plurality of final subject images into a low-resolution image by:
moving the plurality of final subject images by the k-vectors of the light emitting elements; and
performing low pass filtering.

9. The method of claim 8, wherein the plurality of position error candidate values corresponds to a plurality of position error values by global shift.

10. The method of claim 8, wherein the calculating of the plurality of image errors between the final subject images and the original image includes:
generating a plurality of converted images by converting the plurality of final subject images to be matched with a subject image acquired by a predetermined light emitting element; and
calculating a plurality of image errors between the plurality of converted image and an original image corresponding to the predetermined light emitting element.

11. The method of claim 8, wherein the calibrating of the position of the light source unit based on the plurality of image errors includes:
   defining a first polynomial function including the plurality of image errors; and
   determining a position error value of the light source unit using a minimum value of the first polynomial function.

12. The method of claim 11, wherein the determining the position error value of the light source unit using the minimum value of the first polynomial function includes determining a position error value corresponding to a minimum image error of the first polynomial function as the position error value of the light source unit.

13. The method of claim 8, wherein the calibrating of the position of the light source unit based on the plurality of image errors includes:
   setting a new position error value after calculating the plurality of image errors;
   determining a new image error corresponding to the new position error value;
   defining a second polynomial function including a minimum image error of the plurality of image errors, a next small image error following the minimum image error, and the new image error; and
   determining a position error value of the light source unit based on the second polynomial function.

14. The method of claim 13, wherein the determining a position error value of the light source unit using the second polynomial function includes determining a position error value corresponding to a minimum image error of the second polynomial function as the position error value of the light source unit.

* * * * *